(12) United States Patent
Gough et al.

(10) Patent No.: US 11,423,595 B2
(45) Date of Patent: *Aug. 23, 2022

(54) ARTISTIC REPRESENTATION OF DIGITAL DATA

(71) Applicant: Google LLC, Mountain View, CA (US)

(72) Inventors: Tyler Gough, Mill Valley, CA (US); Philip Dam Roadley-Battin, Oakland, CA (US); Seth Benson, San Francisco, CA (US); Curtis Flanagan, Oakland, CA (US); Richard Lee Marks, Pleasanton, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/114,930

(22) Filed: Dec. 8, 2020

(65) Prior Publication Data

US 2021/0090309 A1 Mar. 25, 2021

Related U.S. Application Data

(63) Continuation of application No. 16/560,173, filed on Sep. 4, 2019, now Pat. No. 10,891,766.

(51) Int. Cl.
*G06T 11/00* (2006.01)
*G06T 11/20* (2006.01)
*G06T 13/80* (2011.01)

(52) U.S. Cl.
CPC .......... *G06T 11/206* (2013.01); *G06T 11/001* (2013.01); *G06T 13/80* (2013.01)

(58) Field of Classification Search
None
See application file for complete search history.

(56) References Cited

U.S. PATENT DOCUMENTS

| 6,967,652 | B1 | 11/2005 | Nubling et al. |
| 7,280,105 | B2* | 10/2007 | Cowperthwaite ....... G06T 15/40 345/418 |
| 7,561,165 | B2* | 7/2009 | Strassenburg-Kleciak ................. G06T 7/593 345/582 |
| 8,289,343 | B2* | 10/2012 | Sorgard .................... G06T 9/00 345/582 |

(Continued)

FOREIGN PATENT DOCUMENTS

| EP | 3002691 A1 | 4/2016 |
| JP | 2000116785 A | 4/2000 |

(Continued)

OTHER PUBLICATIONS

Extended European Search Report for European Patent Application No. 20191545.1 dated Nov. 4, 2020. 8 pages.

(Continued)

*Primary Examiner* — Martin Mushambo
(74) *Attorney, Agent, or Firm* — Lerner, David, Littenberg, Krumholz & Mentlik, LLP

(57) ABSTRACT

A system and method is provided for generating a modified Cartesian representation of received data. In some aspects, a Cartesian graph may be transformed to form a modified Cartesian representation by connecting a first end and second end of the Cartesian graph. In further aspects, a pattern may be overlaid over the modified Cartesian representation to produce an artistic representation.

20 Claims, 14 Drawing Sheets

(56) References Cited

U.S. PATENT DOCUMENTS

| | | | |
|---|---|---|---|
| 8,638,334 B2* | 1/2014 | Jin | G06T 19/00 345/520 |
| 8,684,929 B2 | 4/2014 | Heaton | |
| 8,988,426 B2* | 3/2015 | Chen | G06T 19/00 345/419 |
| 9,063,631 B2* | 6/2015 | Laukkanen | G06F 3/04842 |
| 9,165,395 B2* | 10/2015 | Nakamura | G06T 11/001 |
| 9,305,390 B2* | 4/2016 | Schlichte | G06T 15/04 |
| 9,436,757 B1 | 9/2016 | Raynaud | |
| 9,508,196 B2* | 11/2016 | Chen | G06T 19/20 |
| 10,126,923 B2* | 11/2018 | Van Der Westhuizen | G06F 16/84 |
| 10,398,513 B2 | 9/2019 | Razzaque | A61B 34/25 |
| 2003/0214505 A1* | 11/2003 | Guenther | G06T 11/206 345/440 |
| 2005/0039145 A1* | 2/2005 | Diering | G06F 16/904 715/853 |
| 2005/0234362 A1 | 10/2005 | Kaiser et al. | |
| 2006/0087505 A1* | 4/2006 | Dumesny | G06T 15/04 345/419 |
| 2007/0126732 A1* | 6/2007 | Robertson | G06T 11/60 345/419 |
| 2008/0109168 A1 | 5/2008 | Koren et al. | |
| 2008/0208027 A1 | 8/2008 | Heaton | |
| 2014/0049538 A1* | 2/2014 | Baudel | G06K 9/627 345/419 |
| 2014/0228657 A1* | 8/2014 | Palley | A61B 5/14551 600/324 |
| 2015/0130788 A1* | 5/2015 | Bailiang | G06T 17/05 345/419 |
| 2015/0254880 A1 | 9/2015 | Brayanov et al. | |

FOREIGN PATENT DOCUMENTS

| | | |
|---|---|---|
| JP | 2001067486 A | 3/2001 |
| JP | 2008178669 A | 8/2008 |
| JP | 2018149175 A | 9/2018 |
| KR | 20060123457 A | 12/2006 |
| KR | 20160097411 A | 8/2016 |
| KR | 20170134513 A | 12/2017 |
| WO | 2015098573 A1 | 7/2015 |
| WO | 2016142865 A1 | 9/2016 |

OTHER PUBLICATIONS

Office Action for Japanese Patent Application No. 2020-129156 dated Oct. 5, 2021. 8 pages.

Office Action for Korean Patent Application No. 10-2020-0101899 dated Dec. 28, 2021. 7 pages.

Notice of Allowance for Korean Patent Application No. 10-2020-0101899 dated Jun. 13, 2022. 3 pages.

Decision for Rejection for Japanese Patent Application No. 2020-129156 dated Jul. 12, 2022. 11 pages.

* cited by examiner

300

400

700

750

1000

1050

1100

1050

ARTISTIC REPRESENTATION OF DIGITAL DATA

CROSS-REFERENCE TO RELATED APPLICATIONS

The present application is a continuation of U.S. patent application Ser. No. 16/560,173, filed on Sep. 4, 2019, the disclosure of which is incorporated herein by reference.

BACKGROUND OF THE DISCLOSURE

Information can be presented in a number of ways. While bulk sets of data may simply be textually or numerically listed, such as a set of numbers in table form, a viewer may have trouble manually parsing through this information. For instance, it can be difficult to understand how the data is trending or to conceptualize the magnitude of how portions of the data relate to each other.

Visually presenting information normally includes the use of graphs or charts. While such methods are capable of efficiently presenting information, they are generally limited to the constraints of the Cartesian-coordinate system. For instance, when attempting to visualize two sets of data, one set of data is graphed along one axis, such as the x-axis, and the other set of data is graphed along another axis, such as the y-axis. The data can then be related through the use of various visual constructs, such as a line, wave, bars, set of points, or the like.

The practicality of the Cartesian-coordinate system in efficiently presenting information starts to reach its limits when attempting to compare more than two sets of data in one graph. One method of displaying such additional information is through adding more visual constructs as needed. However, this can visually clutter the presentation of the information in such a way that a viewer may be required to expend more effort to understand what is being presented. An alternative means of visually presenting information can be seen in a pie graph. However, the limits of this method are even more stark as a pie graph can only display a few numbers at a time before the "slices" of the graph become too small to be comprehensible.

BRIEF SUMMARY OF THE DISCLOSURE

The present disclosure provides for a system and method of presenting numerous sets of information without an abundance of visual clutter such that the information can be efficiently and easily understood by a viewer.

One aspect of the disclosure provides for a method using one or more processors. The method may include: receiving data from one or more sensors, the data related to a user state measured over a period, the data having at least a first value and a second value within the period; generating a modified Cartesian representation of the received data, wherein the modified Cartesian representation comprises: a first end corresponding to a beginning of the period and a second end corresponding to an end of the period, the first end being connected to the second end, and a center; wherein a first distance between the center and a first portion of the representation corresponds to the first value of the data, and a second distance between the center and a second portion of the representation corresponds to the second value of the data, wherein the first distance is different than the second distance; and providing the modified Cartesian representation for display. Further, the method may further comprise generating a Cartesian representation of the received data, wherein the period is represented along an x-axis and the data is represented along a y-axis, wherein generating the modified Cartesian representation comprises manipulating the Cartesian representation. Further, the method may further comprise determining a baseline metric having a baseline distance from the center. Further, the method may further comprise providing the baseline metric for display. Further, the method may further comprise overlaying a pattern having a shape and color over the modified Cartesian representation to produce an artistic representation having a first extension based on at least one of the first distance or the second distance. Further, the pattern may have a first edge and the method may further comprise animating the first edge to have a first movement. Further, the method may further comprise changing the color of the pattern based on at least one of the first distance or the second distance. Further, the method may further comprise generating a random appearance to the pattern. Further, generating the random appearance may include the random appearance having a geometric sequence, wherein the geometric sequence at least repeats or changes in size. Further, the modified Cartesian representation may comprise a circle. Further, the method may further comprise generating an appearance to the pattern selected from the group consisting of a dotted pattern, a halo pattern, a marbled pattern, and a light trail pattern. Further, the modified Cartesian representation may have a circumferential plane, and the method may further comprise generating a three-dimensional appearance to the pattern, wherein the three-dimensional appearance includes at least one extension that extends in a radial direction from the center and a vertical direction from the circumferential plane.

Another aspect of the disclosure provides for a system that includes one or more computing devices, and memory storing instructions, the instructions being executable by the one or more computing device. The one or more computing devices may be configured to: receive data from one or more sensors, the data related to a user state measured over a period, the data having at least a first value and a second value within the period; generate a modified Cartesian representation of the received data, wherein the modified Cartesian representation comprises: a first end corresponding to a beginning of the period and a second end corresponding to an end of the period, the first end being connected to the second end, and a center; wherein a first distance between the center and a first portion of the representation corresponds to the first value of the data, and a second distance between the center and a second portion of the representation corresponds to the second value of the data, wherein the first distance is different than the second distance; and provide the modified Cartesian representation for display. Further, the one or more computing devices may be a user-wearable device. Further, the one or more computing devices may be further configured to overlay a pattern having a shape and color over the modified Cartesian representation to produce an artistic representation having a first extension based on at least one of the first distance or the second distance. Further, the one or more computing devices may be further configured to change the color of the pattern based on at least one of the first distance or the second distance. Further, the one or more computing devices may be further configured to generate a random appearance to the pattern.

A yet further aspect of the disclosure provides for a non-transitory computing-device readable storage medium on which computing-device readable instructions of a program are stored, the instructions, when executed by one or more computing devices, causing the one or more computing devices to perform a method. The method may include: receiving data from one or more sensors, the data related to a user state measured over a period, the data having at least a first value and a second value within the period; generating a modified Cartesian representation of the received data, wherein the modified Cartesian representation comprises: a first end corresponding to a beginning of the period and a second end corresponding to an end of the period, the first end being connected to the second end, and a center; wherein a first distance between the center and a first portion of the representation corresponds to the first value of the data, and a second distance between the center and a second portion of the representation corresponds to the second value of the data, wherein the first distance is different than the second distance; and providing the modified Cartesian representation for display. Further, the method may further comprise overlaying a pattern having a shape and color over the modified Cartesian representation to produce an artistic representation having a first extension based on at least one of the first distance or the second distance. Further, the method may further comprise changing the color of the pattern based on at least one of the first distance or the second distance.

BRIEF DESCRIPTION OF THE DRAWINGS

The patent or application file contains at least one drawing executed in color. Copies of this patent or patent application publication with color drawings will be provided by the Office upon request and payment of the necessary fee.

These and other features, aspects, and advantages of the present disclosure will become better understood with regard to the following description, and accompanying drawings where.

DETAILED DESCRIPTION

The present disclosure provides for the display of information related to a user on a user device using artistic expression. For example, the user device may collect information related to the user, such as blood pressure, heartrate, body temperature, etc. Based on the collected information, the device may determine a status of the user, such as whether the user is stressed, excited, depressed, physically active, or the like. Such information can be indicated to the user in a way that is visually appealing and also easy to understand. For example, rather than charts, graphs, or the like, an artistic representation may be provided to the user, wherein changes in the artistic expression from one portion to another assists in distinguishing those portions relative to each other, and to the entire artistic representation, to provide a more intuitive indication of how the user's status changed. This may be particularly beneficial in indicating how the user's status changed over a period of time, such as several hours, a day, a week, etc.

Example Arrangement

Figure 1A:
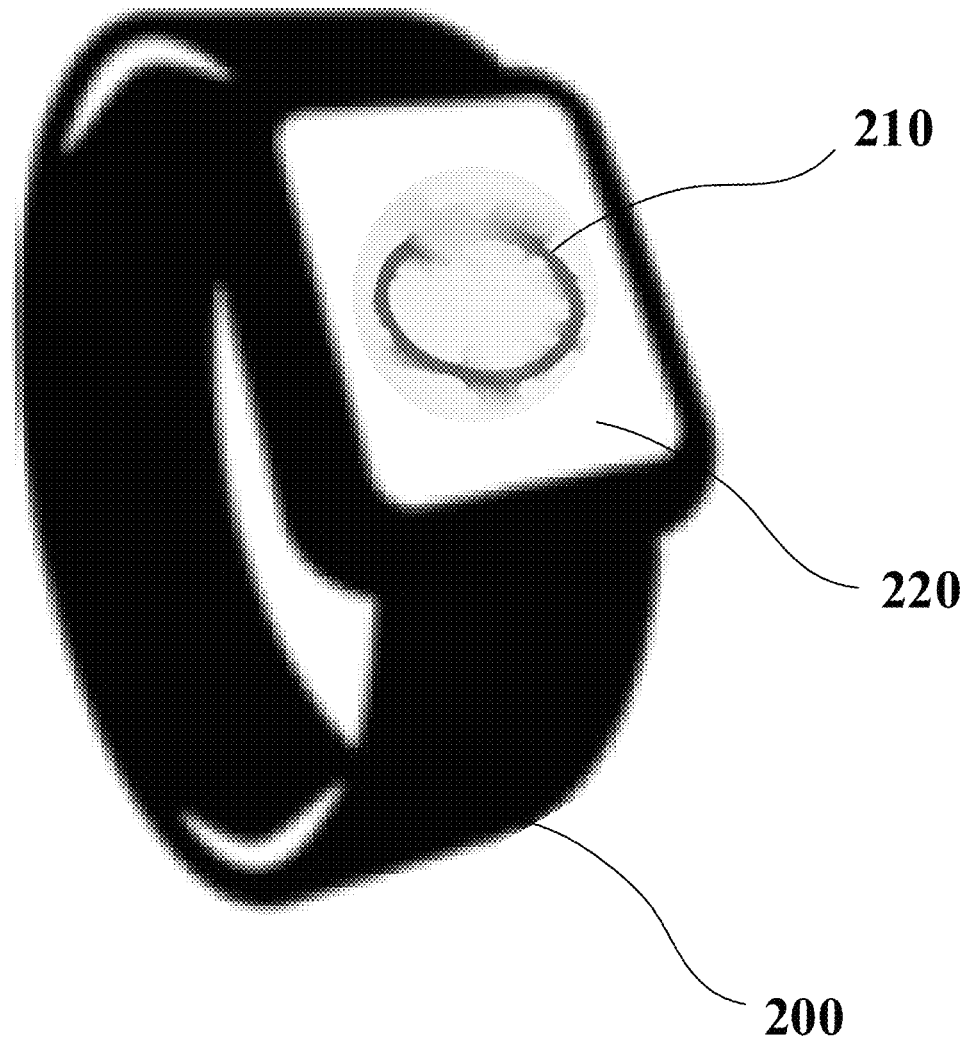
FIG. 1A is an example user-wearable device illustrating an artistic waveform in accordance with aspects of the disclosure.

FIG. 1A depicts a client device 200 displaying gathered metrics of a user in an artistic waveform 210 on screen 220. Client device 200 includes a number of sensors to measure metrics of a user for display in an efficient and easy to understand manner, as further described below. While the client device 200 is illustrated as a smart watch, it should be understood that the device may be any of a variety of other types of devices. For example, the device may be another type of wearable electronic device, such as smart glasses, rings, pendants, etc. In other examples, the device may be an electronic device in communication with a wearable device, such as a mobile phone, laptop, tablet, etc.

Figure 1B:
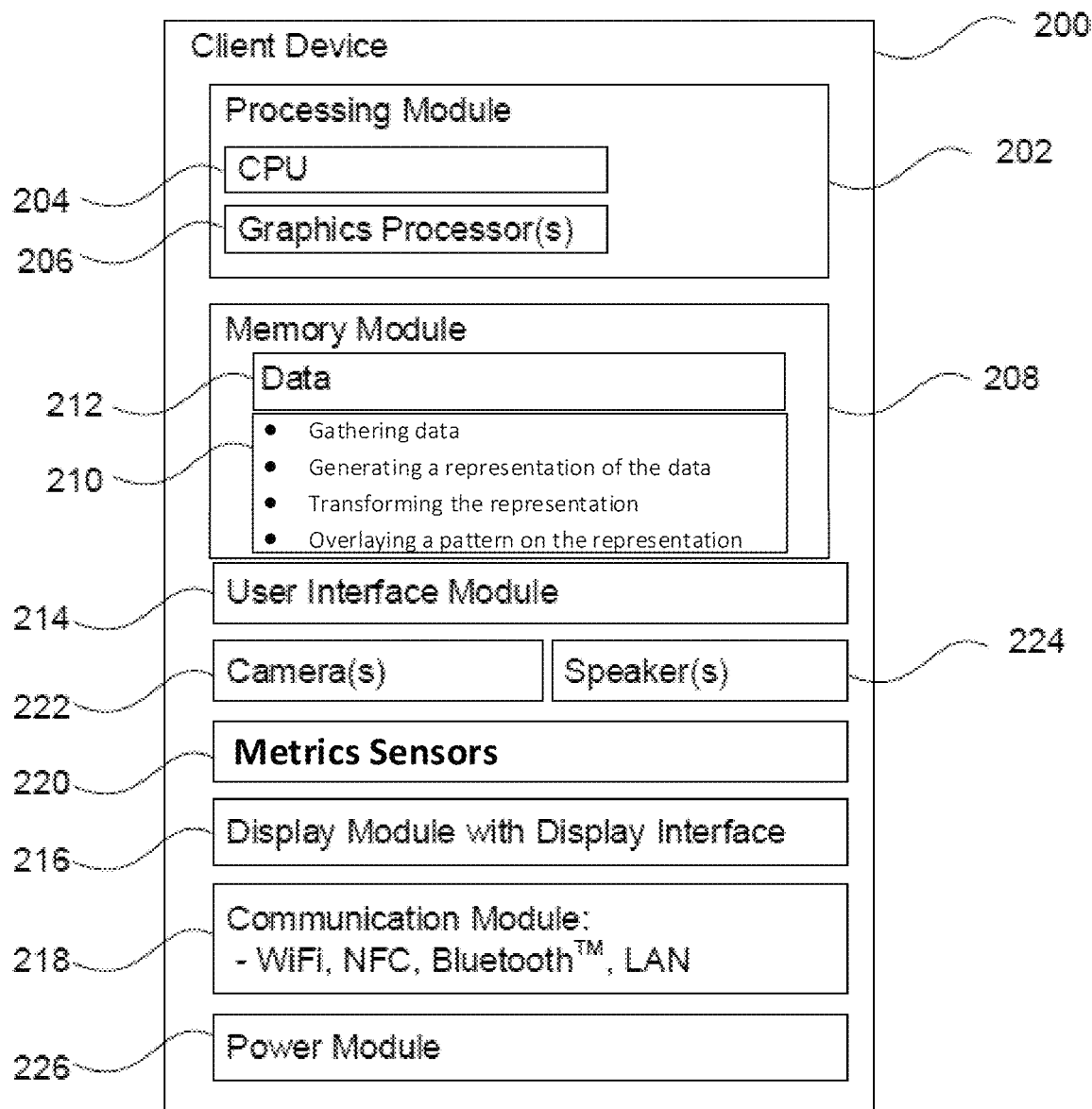
FIG. 1B is the user-wearable device of FIG. 1A configured in accordance with aspects of the disclosure.

FIG. 1B illustrates example internal components of the client device 200. As shown, the client device 200 includes a processing module 202 having one or more computer processors such as a central processing unit 204 and/or graphics processors 206, as well as memory module 208 configured to store instructions 210 and data 212. The processors may or may not operate in parallel, and may include ASICs, controllers and other types of hardware circuitry. The processors are configured to receive information from a user through user interface module 214, and to present information to the user on a display device of the display module 216 having a display interface.

User interface module 214 may receive commands from a user via user inputs and convert them for submission to a given processor. The user inputs may include one or more of a touch screen, keypad, mouse, stylus, microphone, or other types of input devices. The display module 216 may comprise appropriate circuitry for driving the display device to present graphical and other information to the user. By way of example, the graphical information, such as waveform graphics and graphical animations, may be generated by the graphics processor(s) 206, while CPU 204 manages overall operation of the client device 200. The graphical information may display waveforms, and/or animations of those waveforms, on the display module 216. For instance, the processing module may run an application related to indicating a user's status, or other service, using instructions and data stored in memory module 208, and present an artistic representation of that user's status associated with the browser application or other service to the user via the display module 216.

Memory module 208 can be implemented as one or more of a computer-readable medium or media, a volatile memory unit or units, or a non-volatile memory unit or units. The memory module 208 may include, for example, flash memory and/or NVRAM, and may be embodied as a hard-drive or memory card. Alternatively the memory module 208 may also include DVDs, CD-ROMs, high-density tape drives, and other types of write-capable or read-only memories. In one implementation, a computer program product is tangibly embodied in an information carrier. The computer program product contains instructions, such as instructions 210 that, when executed by one or more processors, perform one or more methods such as those described herein. As shown, instructions 210 may include gathering data, generating a representation of the data, transforming the representation, and overlaying a pattern to the representation. The information carrier is a computer- or machine-readable medium, such as memory module 208. Although FIG. 1B functionally illustrates the processor(s), memory module, and other elements of device 200 as being within the same overall block, such components may or may not be stored within the same physical housing. For example, some or all of the instructions and data may be stored on an information carrier that is a removable storage medium, such as an optical drive, high-density tape drive, USB drive or the like, and others stored within a read-only computer chip.

The data 212 may be retrieved, stored or modified by the processors in accordance with the instructions 210. For instance, although the claimed subject matter is not limited by any particular data structure, the data may be stored in computing device registers, in a relational database as a table having a plurality of different fields and records, XML documents or flat files. The data may also be formatted in any computing device-readable format.

The instructions 210 may be any set of instructions to be executed directly, through machine code or the like, indirectly, through scripts or the like, by the processor(s). For example, the instructions may be stored as computing device code on the computing device-readable medium. In that regard, the terms "instructions" and "programs" may be used interchangeably herein. The instructions may be stored in object code format for direct processing by the processor(s), or in any other computing device language including scripts or collections of independent source code modules that are interpreted on demand or compiled in advance. Functions, methods and routines of the instructions are explained in more detail below.

As also shown in FIG. 1B, the client device 200 includes a communication module 218 for communicating with other devices and systems. The communication module 218 includes a wireless transceiver; alternatively, the module may include a wired transceiver in addition to or in place of the wireless transceiver. The client device 200 may communicate with other remote devices via the communication module 218 using various configurations and protocols, including short range communication protocols such as near-field communication, Bluetooth™, Bluetooth™ Low Energy (BLE), or other ad-hoc networks, the Internet, intranets, virtual private networks, wide area networks, local networks, private networks using communication protocols proprietary to one or more companies, Ethernet, WiFi and HTTP, and combinations of the foregoing.

In addition, the client device 200 as shown may include one or more metric sensors 220. The metric sensors 220 are configured to measure the metrics of a user using client device 200. For example, these components may include a photoplethysmography sensor (PPG), accelerometer, gyroscope, electrodermal activity sensor (EDA), skin temperature sensor, microphone, temperature sensor, humidity sensor, barometer, or any of a variety of other types of sensors for detecting human and/or environmental conditions. The client device 200 may also include one or more camera(s) 222 for capturing still images and recording video streams, one or more speaker(s) 224 and a power module 226, as well as actuators (not shown) to provide tactile feedback or other information to the user.

Figure 2:
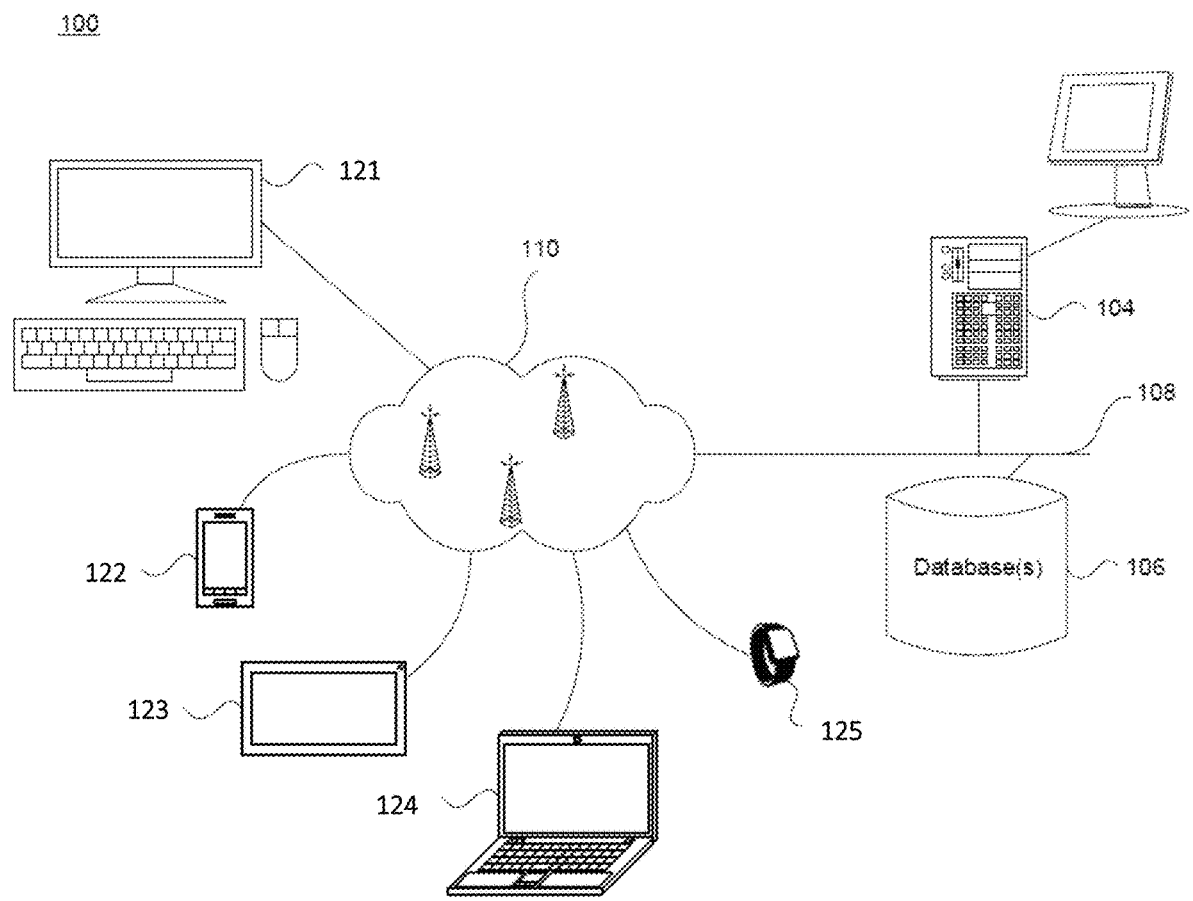
FIG. 2 is an example system in accordance with aspects of the disclosure.

In some examples, various client devices may display artistic representations of data stored in a remote location by accessing the data over a network. For example, FIG. 2 illustrates an example system 100 in which different client devices, such as desktop PC 121, mobile phone 122, tablet 123, laptop 124, and smartwatch 125, may request content or other information from server 104 via communication network 110 such that the various client devices may display the gathered metrics. For example, a user may want to display his status information on his smartwatch, tablet, or other devices. Any such client device may send requests and receive query results from the server 104 as discussed herein. The server 104 may be coupled to one or more databases 106 via link 108. As described above, the database(s) may include a metrics database to allow a user to access and remotely view the data on various types of devices. Any user data stored in the remote database is stored securely such that only authorized access is permitted. Moreover, personally identifiable information, such as names or the like, may be removed and the data may instead be identified using a code or identifier.

When the user requests information related to his metrics, the server may access the database(s) to retrieve information used to generate a waveform graphical representation of the measured metrics of a user, and may send the metrics to the client device for generating the waveform graphical representation at the client device. Alternatively or additionally, the server may send the generated waveform to the client device for display.

An example server system may be employed with the techniques disclosed herein. The server system includes various components similar to those described above for the client device 200. For instance, the server device may include a processing module having one or more computer processors such as a central processing unit and/or graphics processors, as well as memory module configured to store instructions and data. The processors may or may not operate in parallel, and may include ASICs, controllers and other types of hardware circuitry.

As with memory module 208, the memory module can be implemented as one or more of a computer-readable medium or media, a volatile memory unit or units, or a non-volatile memory unit or units. The memory module may include, for example, flash memory and/or NVRAM, and may be embodied as a hard-drive or memory card. Alternatively the memory module may also include DVDs, CD-ROMs, high-density tape drives, and other types of write-capable or read-only memories. In one implementation, a computer program product is tangibly embodied in an information carrier. The computer program product contains instructions, such as instructions that, when executed by one or more processors, perform one or more methods such as those described herein. The information carrier is a computer- or machine-readable medium, such as memory module 208. Although the above disclosure functionally describes the processor(s), memory module, and other elements of the server system as being within the same overall block, such components may or may not be stored within the same physical housing. For example, some or all of the instructions and data may be stored on an information carrier that is a removable storage medium, such as an optical drive, high-density tape drive, USB drive, or the like, and others stored within a read-only computer chip.

The data of the memory module may be retrieved, stored or modified by the processors in accordance with the instructions. For instance, although the claimed subject matter is not limited by any particular data structure, the data may be stored in computing device registers, in a relational database as a table having a plurality of different fields and records, XML documents or flat files. The data may also be formatted in any computing device-readable format. As with instructions 210, the server instructions may be any set of instructions to be executed directly, through machine code or the like, or indirectly, through scripts or the like, by the processor(s), and the above discussion of instructions 210 applies to the server instructions here as well.

By way of example, the processors in the processing module of the above server may be arranged in a distributed architecture. In a distributed architecture, the server system may comprise multiple server units, for instance in a cloud computing arrangement. Whether in an inclusive or distributed architecture, the processors are operatively coupled to the database(s). In one example, the databases include a metrics database that allows a user to access and remotely view the data on other devices other than client device 200. For instance, the user may view the gathered metrics on laptop 100, tablet 100, mobile phone 100, smartwatch 100 and desktop PC 100, as described above. The database may also include a graphics database that provides various means of graphing the metrics of metrics database. While the database can including both the metrics database and the graphics database, such information may be stored in multiple discrete databases. The databases may be distributed, for instance across multiple memory modules or other storage devices of a cloud computing architecture.

The server system can also include a server communication module for communicating with other devices and systems. This server communication module may include a wireless transceiver. The server communication module may also include a wired transceiver in addition to or in place of the wireless transceiver. The server system can communicate with other remote devices via the server communication module using various configurations and protocols, including short range communication protocols such as near-field communication, Bluetooth™, Bluetooth™ Low Energy (BLE), or other ad-hoc networks, the Internet, intranets, virtual private networks, wide area networks, local networks, private networks using communication protocols proprietary to one or more companies, Ethernet, WiFi and HTTP, and combinations of the foregoing.

In addition, the server system includes a power module. Other system elements, including computer components shown in FIG. 1B, may also be included within the server system.

Example Methods and Use Cases

Selecting the Data

As used in this application, "superior" refers to a radial distance farther from the center of a circle and "inferior" refers to a radial distance closer to the center of the circle.

Additionally, "artistic" is used to indicate a characteristic that includes at least one of a shape and color. In this manner, an artistic waveform may indicate that a first waveform has an additional color and/or shape attributed to that first waveform to produce the artistic waveform.

"Cartesian" representation is a graphical representation involving an x-axis extending horizontally and a y-axis extending vertically. In a Cartesian representation, data is displayed such that one set of metrics are plotted along the horizontal x-axis and the other set of metrics is plotted along the vertical y-axis. A "modified Cartesian" representation is a graphical representation where the x-axis is no longer horizontal and/or the y-axis is no longer vertical. For example, in a modified Cartesian system, data may be displayed through a distinct shape, such as a circle or alternative shapes as described further below, rather than in a horizontally or vertically linear fashion.

Features of the technology can be implemented in different use cases. Examples of certain use cases are discussed below, although the technology may be employed in other situations and is not limited to those expressly provided herein. For different use cases, the user may request information via a mobile app or service on his or her client device. The requested information could be information about the user over a period of time. For instance, this may include measuring a user's emotional state over a one day period. Alternatively, information about the user can include the user's stress, fitness level, sleep, or any other data about a measured user state. The time periods may be over hours, minutes, days, months, years, user-defined time periods, or any other period. Other situations may involve displaying such information over any given cyclical period of measurement, including repetitious events such as a commute, gym visits, or the like.

Through a client device such as a smartwatch or other electronic device, as described above, metrics about the user are intermittently collected, such as every five seconds, minute, five minutes, or any other time frame, throughout a given time period. For instance, metric sensors 220 can measure a number of metrics, including a user's heart rate, respiratory rate, heart rate variability (HRV), skin conductance level, skin temperature, motion, or any of a variety of other metrics related to a user state or other conditions surrounding the user, such as weather, noise, etc.

In the initial stages of measurement, the raw data provided by the sensors may have too much variability to be accurately used as an eligible metric for visualization. Such data may undergo certain filtering and interpolation processes, to "smooth" out the data for proper visualization. This process may include bandpass filtering, Gaussian-sum filtering, or any other process by which data can be rendered less erratic.

Moreover, even after the data has been filtered, the client device may require certain cut-off conditions to be met before considering the measured data to be an eligible metric for visualization. For instance, data having large rates of change may be disregarded as being unrepresentative of a user's emotional state. As an example, a large rate of change in temperature may indicate a warm-up period when a user has just equipped the client device or a cool-down period when the user has just unequipped the client device and is disregarded by the client device. For example, where a temperature changes from the ambient temperature of the surrounding environment to adjust to the temperature of a user's skin, the temperature may increase more than 0.5° C. per minute. Due to this spike in data, the client device may conclude that it has just been equipped and will disregard the measured data for this brief period of time until the rate of temperature change stabilizes. Conversely, where a temperature change decreases more than 0.5° C. per minute, the client device may conclude that the client device has just been unequipped and similarly disregard the measured temperature data for this period of time.

In alternative aspects, the rate of temperature can change to determine when a user equips or unequips the client device can be altered to be more or less than 0.5° C. per minute. This can include, for example, 0.8° C. per minute, 0.01° C. per second, or any other rate of temperature change. In yet other aspects, the data collected by other sensors may be used to determine whether the client device has just been equipped or unequipped. For example, a large rate of change in motion data from the accelerometer may be similarly disregarded as indicating when a user has just equipped or unequipped the client device, when a user has started or stopped using a vehicle, or any other activity that may indicate to the client device that the user is transitioning between different states of velocity. In yet other aspects, the client device may disregard data collected where the rate of change from one sensor is not so large as to meet a cut-off threshold for that one sensor but there is no detected rate of change from other sensors to meet a minimum threshold required to begin measuring data. For example, where the accelerometer detects a certain movement speed, such as while walking, driving, or the like, but no change in temperature, the data may be disregarded by the client device as indicating that the user is carrying the device without wearing it, such as in a backpack, purse, or the like. Additionally, the cut-off conditions may involve detecting the rate of change of a user's heart rate such that a large rate of change of a user's heart rate may indicate that the user device has just been equipped/unequipped or turned on/off, and the data corresponding to that large rate of change is disregarded.

Once the client device has determined the eligible metrics for visualization, each metric may be given a weighted value depending on the measured user state to be displayed. For instance, where the client device is measuring a user's emotional state, a negative weighted value may indicate an inverse correlation between the metric and user's calmness while a positive weighted value may indicate a positive correlation between the metric and a user's calmness. As an example, the heart rate, respiratory rate, skin conductance level, and motion metrics can be given a negative value such that as these metrics increase, a user is considered less calm. Conversely, the HRV and skin temperature metrics may be given a positive weighted value as such that as these metrics increase, a user is considered more calm. Additionally, the magnitude of each metric may indicate how much effect that metric has on the measured user state. For instance, the motion metric may be given less weight than other metrics in determining a user's emotional state as this metric may be considered less impactful than the other metrics.

One example of a set of weighted values may involve setting the heart rate, respiratory rate, and skin conductance level metrics to −1; the motion metric may be set to −0.5; and the HRV and skin temperature metrics may be set to 1. While these values are set for the purposes of determining a user's emotional state, in other aspects, the weighted values of the metrics may be changed according to the desired purpose for using the metrics. For example, in determining a user's level of physical activity throughout a day, the heart rate, respiratory rate, skin conductance level, and motion metric may be set to 1 as metrics that indicate a positive correlation with the user's level of physical activity while the HRV and skin temperature may be set to −1 as metrics that indicate a negative correlation with the user's level of physical activity. As contrasted with determining a user's emotional state, the weight given to the motion metric in measuring a user's physical activity may be increased to indicate that the motion metric is more impactful to a user's physical activity than to a user's emotional state.

The client device may then use the weighted metrics to determine a baseline set of metrics. For example, where the client device is determining a user's emotional state, the baseline metrics can indicate where a user is most calm. The client device may determine the baseline metrics of a user by considering the periods of time when the metrics of that user is relatively stable and consistent, and averaging the data collected during those periods. In an alternative aspect, the user can specify the baseline by choosing the metrics measured during a desired time period. In yet another aspect, the client device can use a standard set of baseline metrics as determined from a metrics database to compare to the measured metrics of the user.

Displaying the Data

Figure 3:
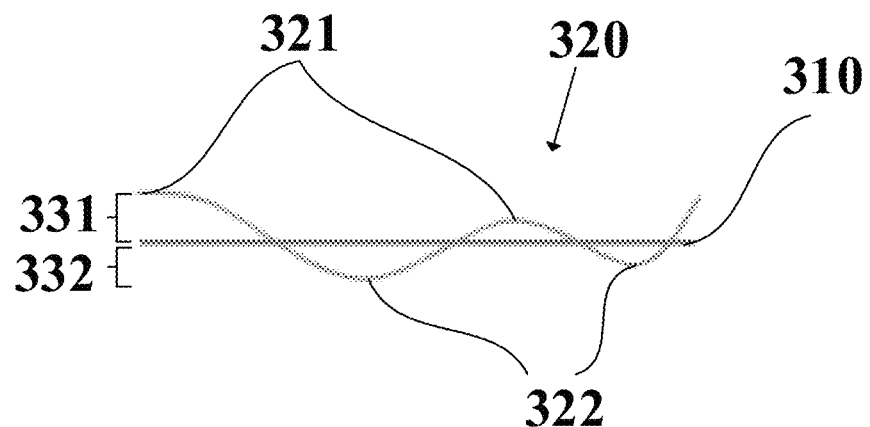
FIG. 3 is a representation of a linear waveform according to one aspect of the disclosure.
Figure 4:
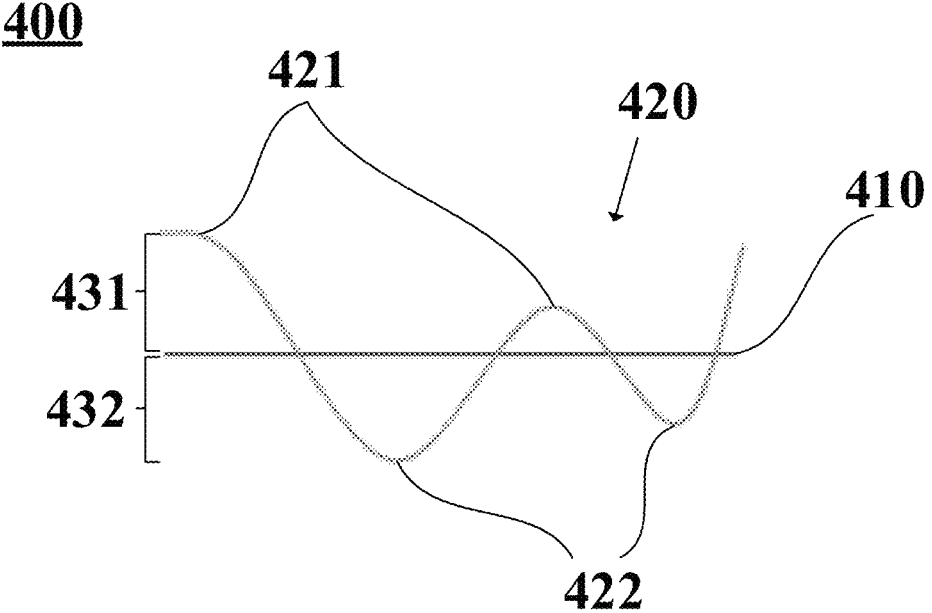
FIG. 4 is a representation of a linear waveform according to another aspect of the disclosure.

The client device then compares the user's baseline metrics to the user's measured metrics for the given period by generating a visual or graphical representation of the metrics. This can include a waveform, histogram, scatterplot, or the like. For example, FIGS. 3-4 depicts a linear or Cartesian waveform 300, 400 representing a measured user state. FIG. 3 depicts a waveform 300 graphically representing baseline metrics 310 and comparative metrics 320 over a period of time. In this instance, the x-axis (or horizontal axis) displays the given period while the y-axis (or vertical axis) displays the gathered data. Baseline metrics 310 is a straight line representing a set of relatively stable metrics for a user. Comparative metrics 320 represents the measured metrics of the user, and has peaks 321 representing a period of time when the user positively differs from baseline metrics 310 and valleys 322 representing a period of time when the user negatively differs from baseline metrics 310. Each of peaks 321 deviate from baseline metrics 321 by a peak distance 331 corresponding to the magnitude of positive difference between peaks 321 and baseline metrics 310. Each of valleys 322 deviate from baseline metrics 321 by a valley distance 332 corresponding to the magnitude of negative difference between peaks 322 and baseline metrics 310. FIG. 4 depicts waveform 400 having baseline metrics 410 and comparative metrics 420, as described above. Here, waveform 400 includes peaks 421 having a larger peak distance 431, while valleys 422 have a larger valley distance 432 than those corresponding features of waveform 300.

For example, if FIG. 3 is displaying a user's emotional state, baseline metrics 310 represents a user's maximal or normative calmness, peaks 321 represents a period of time when the user is more excited than their baseline calm state, and valleys 322 represent a period when the user is more calm than their baseline calm state. In such a case, peak distance 321 corresponds to how excited a user is from their baseline calm state and valley distance 322 corresponds to how much calmer a user is from their baseline calm state. Where waveform 400 of FIG. 4 is also displaying a user's emotional state, the increased magnitude of peak distance 421 and valley distance 422 relative to the corresponding features of waveform 300 indicates that the user experienced more intense levels of excitement and calmness in those respective periods of time.

Figure 5:
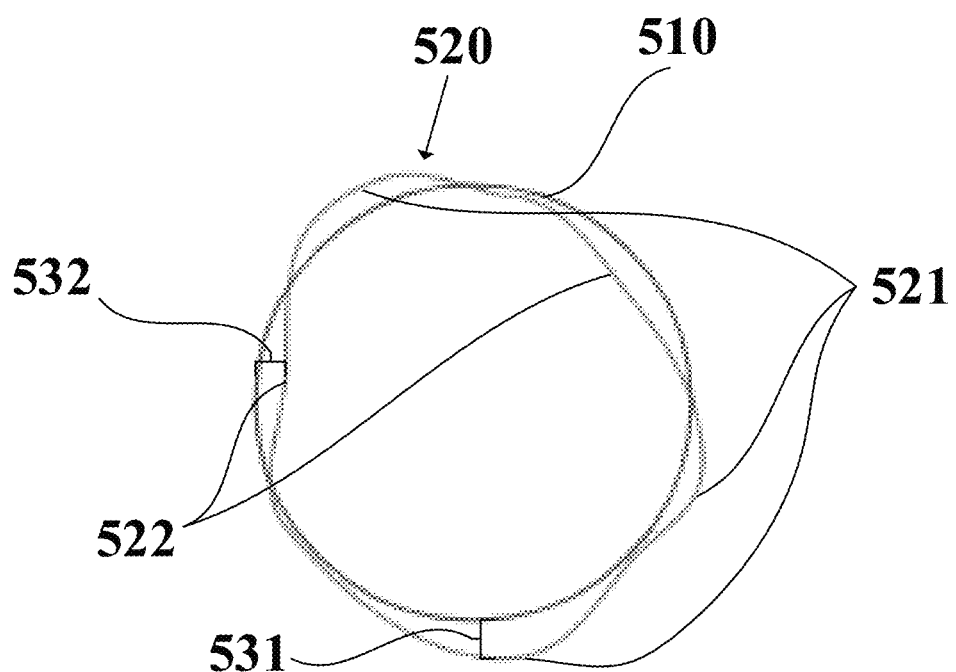
FIG. 5 is a representation of a non-linear waveform according to one aspect of the disclosure.

The waveform may alternatively have a non-linear shape and be displayed in a modified Cartesian representation. FIG. 5 illustrates an example modified Cartesian representation, including a circular waveform 500 having baseline metrics 510 and comparative metrics 520. In this aspect, baseline metrics 510 has a circular shape rather than the linear shape of baseline metrics 310, 410. In alternative aspects, circular waveform 500 can take on other shapes, such as an oval, rectangle, triangle, or any other geometric shape. Additionally, circular waveform 500 can have irregular, non-geometric shapes with non-linear edges and irregular contours, such as organic shapes found in living organisms and nature. Moreover, while the waveform 500 is shown as two-dimensional, in other aspects it may be three-dimensional, such as spherical, etc. Comparative metrics 520 has peaks 521 that extend superior to baseline metrics 510 and valleys 522 that extend inferior to baseline metrics 510. Each of peaks 521 superiorly deviate from baseline metrics 510 by a peak distance 531 corresponding to the magnitude of positive difference between peaks 521 and baseline metrics 510. Each of valleys 522 inferiorly deviate from baseline metrics 510 by a valley distance 532 corresponding to the magnitude of negative difference between valleys 522 and baseline metrics 510. Where FIG. 5 measures a user's emotional state, peaks 521 and peak distances 531 correspond to how excited a user is from their baseline calm state; the larger peak distance 531 is, the more excited a user is. Conversely, valleys 522 and valley distances 532 correspond to how much more calm a user is from their baseline calm state; the larger valley distance 532 is, the calmer a user is.

Additionally, baseline metrics 510 and comparative metrics 511 can be measured from a center. In this instance, baseline metrics 510 will have a constant radial distance from the center while comparative metrics 520 will have a varying radial distance. In this manner, peaks 521 will generally correspond to a first distance further from the center and valleys 522 will generally correspond to a second distance closer to the center. Where a user's emotional state is measured, the farther the distance from the center, the more excited the user is, while the closer to the center, the calmer the user is.

Circular waveform 500 may be formed by applying a wrapping function to a linear waveform. For example, applying the wrapping function to waveform 300 shown in FIG. 3 would involve bending or shaping waveform 300, and connecting the left-most end and right-most end of the data represented along the x-axis to form a circular shape. Forming circular waveform 500 in this manner allows for information to be presented to a user in a more intuitive fashion than with a linear waveform. For instance, where a user's metrics is measured over the course of a day, wrapping a linear waveform so that the end of the measured period connects with the beginning in a circular manner can visually depict the repetitious and cyclical nature of the day. In such an instance, it can be understood that the top of circular waveform 500 can represent the user's emotional state at twelve o'clock in the afternoon, generally understood to be the "top" of the day, and the bottom of circular waveform 500 can represent the user's emotional state at twelve o'clock in the morning, generally understood to be the "bottom" of the day. In this manner, a user can roughly understand what their measured user state was at a general time of the day without having to directly reference a linear axis representing the time, as a user would with a linear waveform, in addition to providing a more aesthetically-pleasing design. This way, a user can understand the data being represented more quickly than where the data is represented in a Cartesian representation. Alternatively, where circular waveform 500 may be used to represent metrics measured during the morning or afternoon, a user may intuitively understand that the top of circular waveform 500 represents twelve o'clock while the bottom of circular waveform 500 represents six o'clock.

In alternative aspects, waveform 300 may be wrapped in a non-linear and non-circular shape, such as a triangular shape, rectangular shape, U-shape, or the like. In yet another aspect, circular waveform 500 may be created without the use of the wrapping function whereby waveform 500 is instantiated in its circular form after determining the eligible set of metrics.

A pattern may be applied to any of the waveforms discussed above to provide additional means of displaying information. For instance, the method may include overlying a pattern having a certain appearance, such as a shape and/or color, corresponding to certain features of the waveforms, such as the waveform's peaks and valleys, and their corresponding peak and valley distances. In this manner, these features of the waveforms may be visually distinguished from each other as well as other parts of the waveform. This overlaying step may produce an artistic representation of the waveform such that the waveform is still visible through the overlaid pattern. Alternatively, overlaying the pattern may include replacing the waveform with the pattern such that the waveform is not visible. In this manner, the user may more quickly and efficiently understand the information being displayed on the client device. The appearance of the pattern may additionally be separately generated based on a user's selections.

Figure 6:
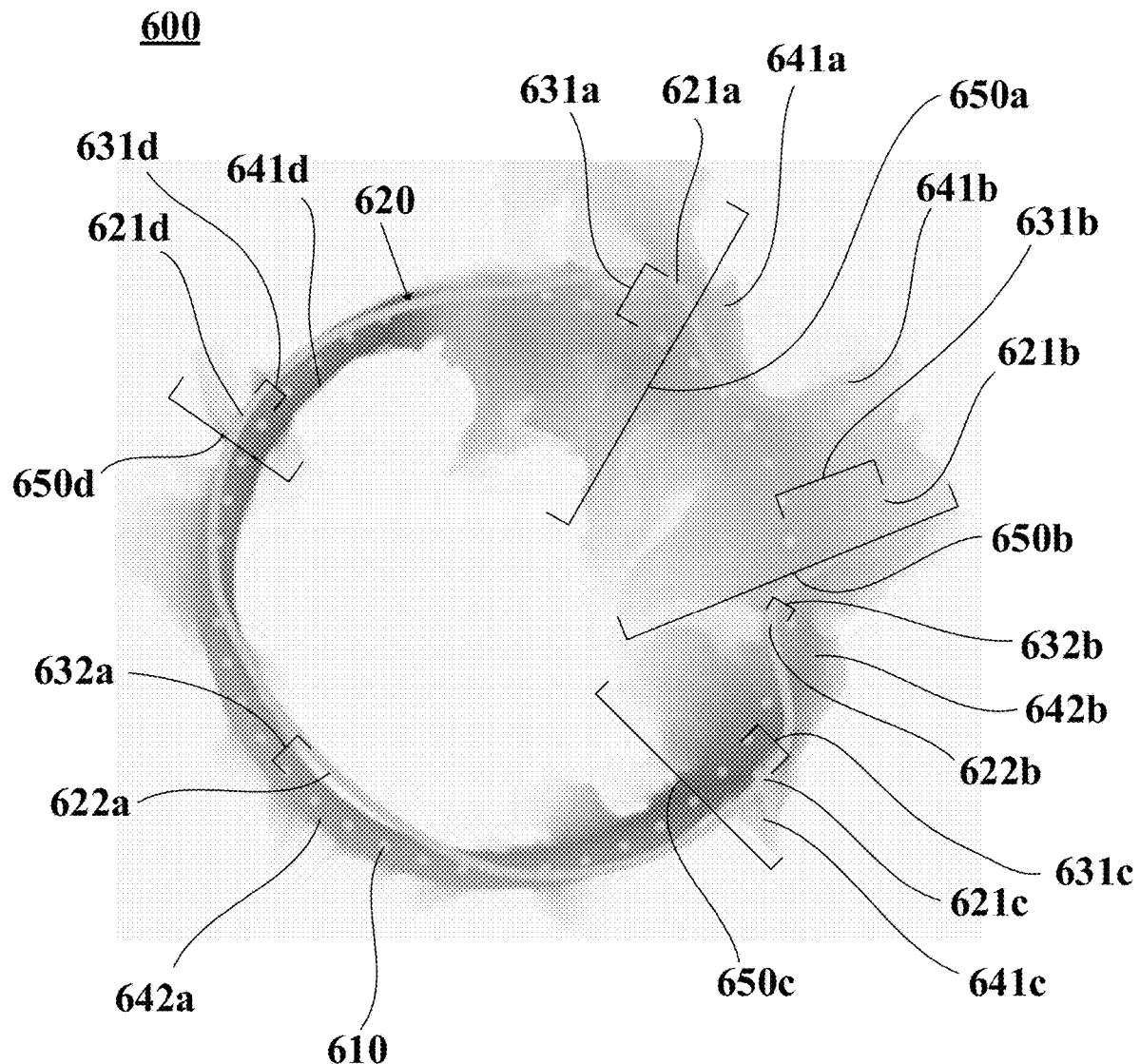
FIG. 6 is a representation of an artistic waveform according to one aspect of the disclosure.

As an example, FIG. 6 depicts an artistic waveform 600 having a fractal and colored pattern overlaid on a circular waveform of baseline metrics 610 and comparative metrics 620 such that baseline metrics 610 and comparative metrics 620 are still visible. In this aspect, baseline metrics 610 are represented by a circle of dots rather than a solid line. Comparative metrics 620 has peaks 621a, 621b, 621c, 621d with corresponding peak distances 631a, 631b, 631c, 631d, and valleys 622a, 622b with corresponding valley distances 632a, 6322b, as described above. The color of the pattern applied to waveform 600 is represented by peak color segments 641a, 641b, 641c, 641d and extensions 650a, 650b, 650c, 650d corresponding with peaks 621a, 621b, 621c, 621d, and valley color segments 642a, 642b corresponding with valleys 622a, 622b. The peak color segments depict a positive difference from the baseline metrics are represented by shades of green while the valley color segments depicting a negative difference from the baseline metrics are represented by shades of blue. In this manner, a user can tell whether they were excited or calmer at a given moment during the measured period by the color of the color segment. The color saturation of the color segments is used to indicate the magnitude of the peak or valley distance such that the more saturated the peak color segment is the larger the distance of the corresponding peak or valley distance. For instance, color segment 641*a* corresponding to peak 621*a* has a deeper hue of green than color segment 641*c* for peak 621*c* as peak distance 631*a* is larger than peak distance 631*c*. Conversely, color segment 642*a* corresponding to valley 622*a* and color segment 642*b* corresponding to valley 622*b* have substantially the same shade of blue as valley distance 632*a* and valley distance 632*b* have substantially the same distance. In this manner, where waveform 600 represents a user's emotional state, the greater a color segment's saturation is, the more intense the user's emotional state is. A color segment's brightness can play a similar role to the saturation.

The shape of the pattern applied to waveform 600 includes extensions 650*a*, 650*b*, 650*c*, 650*d*, which correspond with peaks 621*a*, 621*b*, 621*c*, 621*d* and are sized corresponding to the respective peak distances 631*a*, 631*b*, 631*c*, 631*d*. For instance, extension 650*b* is larger than extension 650*a* as peak distance 631*b* is greater than peak distance 631*a*. While the size of the extension is bounded by the extension's relation to the corresponding peak distance and/or valley distance, the shape of the extension within those bounds may be varied or random, and can have a fractal pattern, geometric pattern, or any other visual patterning. In this aspect, extensions 650*a*, 650*b*, 650*c*, 650*d* has a fractal patterning in the shape of a watercolor bleeding effect bounded by the relation of extensions 650*a*, 650*b*, 650*c*, 650*d* to peak distances 631*a*, 631*b*, 631*c*, 631*d*. In this manner, where waveform 600 represents a user's emotional state, a user can tell how intense their emotional state was at a given time by the size of the extension, in addition to the color saturation of the color segments. Although the extensions generally correspond to the corresponding peaks or valleys, the extensions, in certain instances, can have a flare that may affect the size and shape of the extension. For instance, although peak distance 631*b* is larger than peak distance 631*a*, extension 650*a* is larger than extension 650*b* due to the added flare along the superior portion of extension 650*a*. This can be due to the random-nature of the shape of the extensions shown of waveform 600.

The pattern's shape can additionally be influenced by the metrics immediately preceding or succeeding the peaks or valleys. The peaks and valleys in comparative metrics 620 influence not just the color, saturation, and location of the color segment of the respective extension, but the corresponding features of the portions of waveform 600 adjacent those peaks and valleys. For instance, color segment 641*b* of extension 650*b* is tinged with both a blue and green hue due to extension 650*b* being associated with peak 621*b* and subsequently leading to valley 632*b*. Moreover, the blue portion of color segment 641*b* is located along the superior portion, with the green portion being located along the inferior portion, of extension 650*b* because valley 622*b* succeeds peak 621*b*; thus, the superior portion of the extension has a color that is more indicative of the metrics immediately succeeding that extension, having more of a blue hue in this case, while the inferior portion has a color that is more indicative of the metrics of the extension itself, having a green hue in this case The magnitude of the peak distance may influence the size and appearance of the superior and/or inferior portion of the extension. Where the peak distance meets a certain distance threshold, a portion of the extension may be generated correlating with the size of that peak distance. However, where that distance threshold is not met, that portion of the extension may not be generated. For instance, peak distance 631*d* is small relative to peak distances 631*a*, 631*b*, 631*c* and, as such, the inferior portion of extension 650*d* is smaller than the respective inferior portions of extensions 650*a*, 650*b*, 650*c*. Where the peak distance does not meet this distance threshold, there may be no inferior portion to the extension. For instance, if peak distance 631*d* represents the minimum distance threshold to generate an inferior portion to the extension, the portions immediately surrounding extension 650*d* may have no inferior portion as those surrounding portions has peak distances less than that of peak distance 631*d*.

In other aspects, the pattern may include only an inferior portion of the extensions, such as where the valley distance meets a certain inferior distance threshold. In yet other aspects, the pattern of artistic waveform 600 does not display extensions to represent the magnitude of the peak or valley, and uses only the color and saturation of the color segments to do so. Alternatively, the pattern of artistic waveform 600 does not display color segments to represent the magnitude of the peak or valley, and uses only its shape to do so. For instance, waveform 600 may only have extensions representing the peaks and/or valleys. In other aspects, the color segments may be other colors besides shades of blue and green, such as red, yellow, purple, grayscale, or any other color. In yet other aspects, artistic waveform 600 is monochromatic to represent the predominant emotional state of the user throughout the measured period. In yet other aspects, the color, or color combinations, of artistic waveform 600 may change based on the location of the client device, the specific profile of the user, or the type of data being measured.

As described above, baseline metrics 610 and comparative metrics 620 may additionally correspond to a varying distance from the center such that the peaks can have a first distance greater than a second distance of the valleys. In this manner, the extensions and the valley color segments can have a size, shape, and color corresponding to a radial distance from the center. For example, where artistic waveform 600 represents a user's emotional state, extensions corresponding to comparative metrics further from the center can have more hues of green while valley color segments corresponding to comparative metrics closer to the center can have more hues of blue.

Figure 7A:
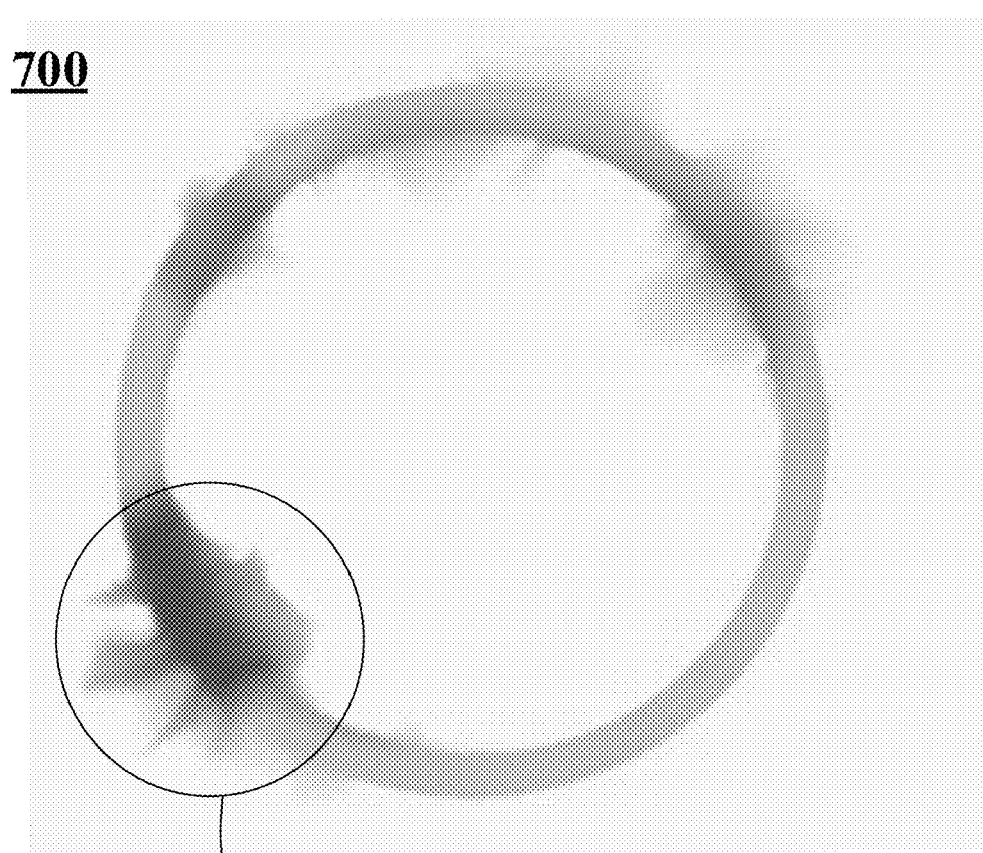
FIG. 7A is a representation of an artistic waveform according to another aspect of the disclosure.
Figure 7B:
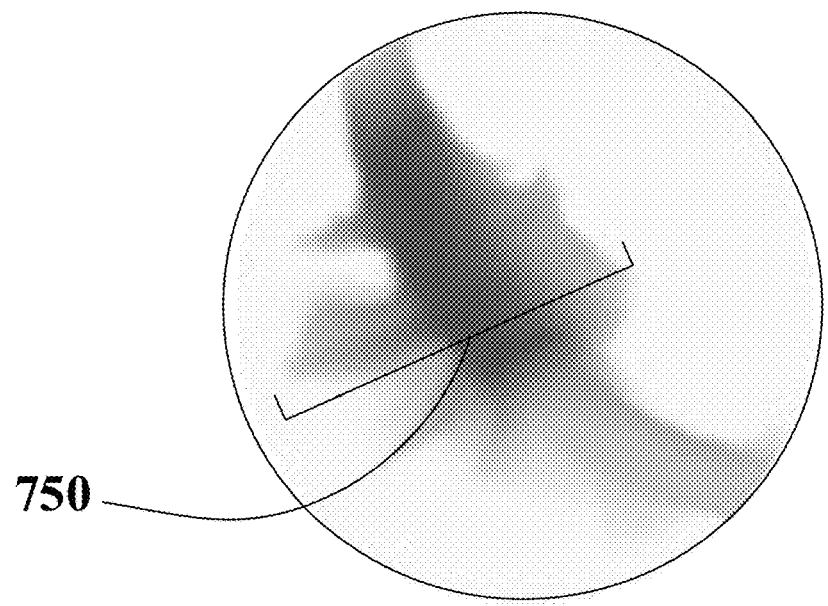
FIG. 7B is a partial view of an extension of the artistic waveform of FIG. 7A.

FIGS. 7A-B depicts an artistic waveform 700 having an extension 750, as described above. In this aspect, the pattern replaces the baseline metrics and comparative metrics such that both sets of metrics are not displayed, and only the pattern overlaid on the measured circular waveform is displayed. As with extension 650 above, the extensions of artistic waveform 700 has a fractal pattern in the form of a watercolor bleeding effect. This fractal pattern is algorithmically generated to give off an appearance that appears random while also mimicking certain repetitive and complex characteristics often found in nature, such as tree branches, river deltas, snowflakes, or a combination of any variety of random or fractal patterns. Overlaying this fractal pattern may include incorporating various geometric sequences that repeat themselves on a smaller and smaller scale. In this manner, artistic waveforms 600, 700 can efficiently convey additional layers of information in a manner that is both naturally and visually appealing to a user.

Figure 8:
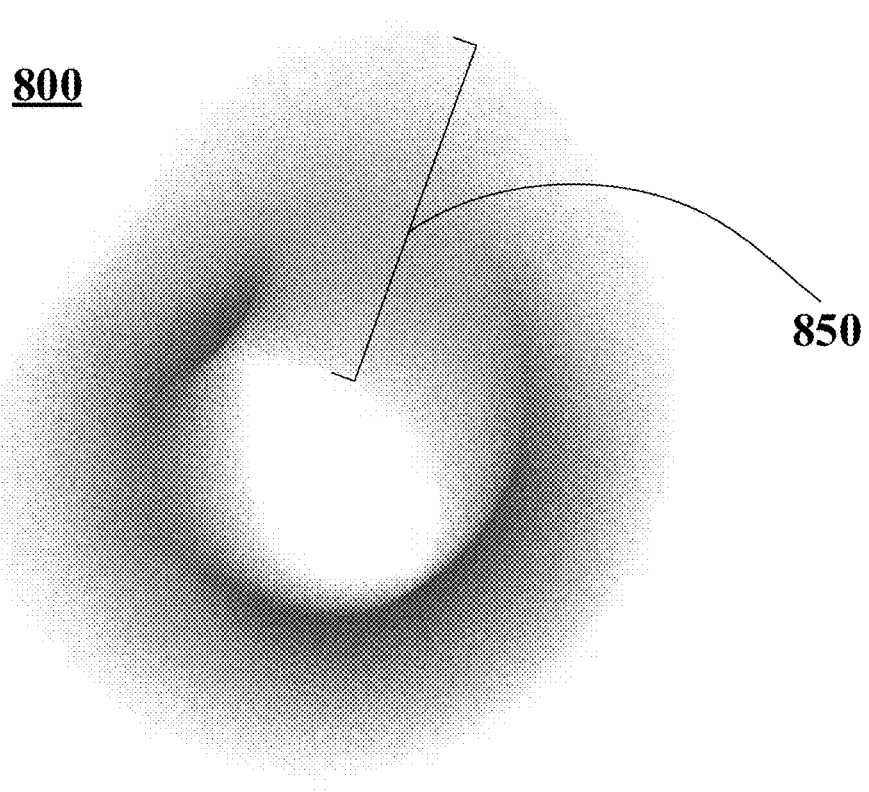
FIG. 8 is a representation of an artistic waveform having a dotted pattern according to another aspect of the disclosure.

In alternative aspects, other patterns may be overlaid onto the waveforms. For instance, FIG. 8 depicts an artistic waveform 800 having a dotted pattern. In this aspect, extensions 850 have a high density of dots close to the baseline metrics (not shown) with a decreasing density of dots as extension 850 extends in a superior or inferior direction. The density of dots, represented by the darker sections of waveform 800, indicate a spike in the comparative metrics (not shown) of a user. For example, the darker sections may indicate where a user is more excited.

Figure 9:
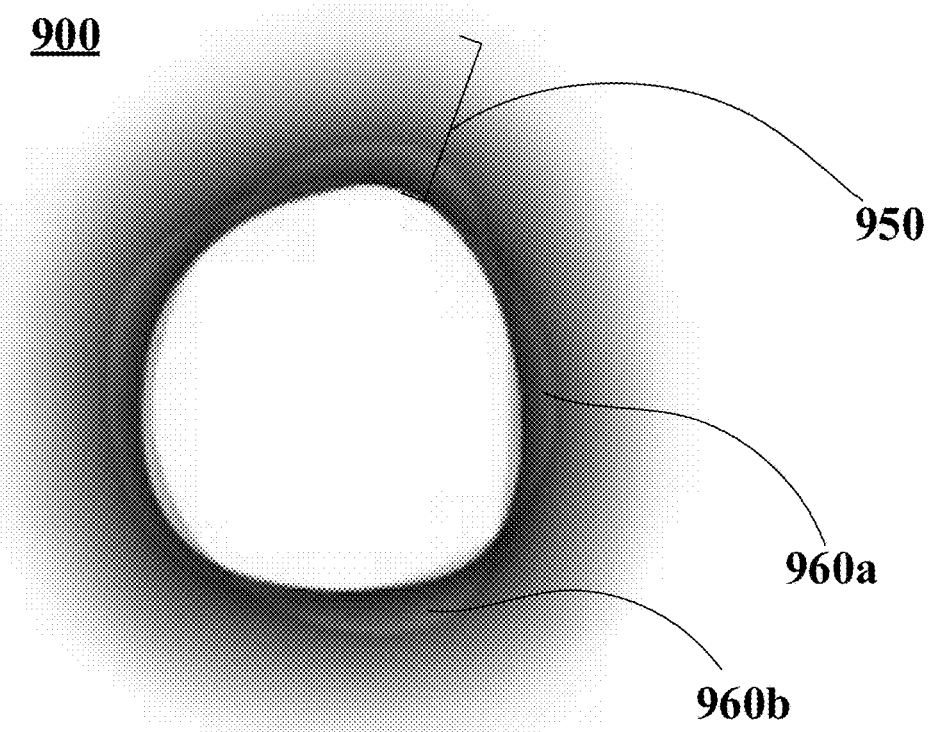
FIG. 9 is a representation of an artistic waveform having a halo pattern according to another aspect of the disclosure.

FIG. 9 depicts an artistic waveform 900, as described above. In this aspect, extensions 950 have a halo pattern and overlaid waveforms 960a, 960b. Overlaid waveforms 960a, 960b can represent the visualization of certain metrics that contributed to the generation of artistic waveform 900. For instance, where waveform 900 depicts a user's emotional state, overlaid waveform 960a can represent a user's heart rate while overlaid waveform 960b can represent a user's motion.

Figure 10:
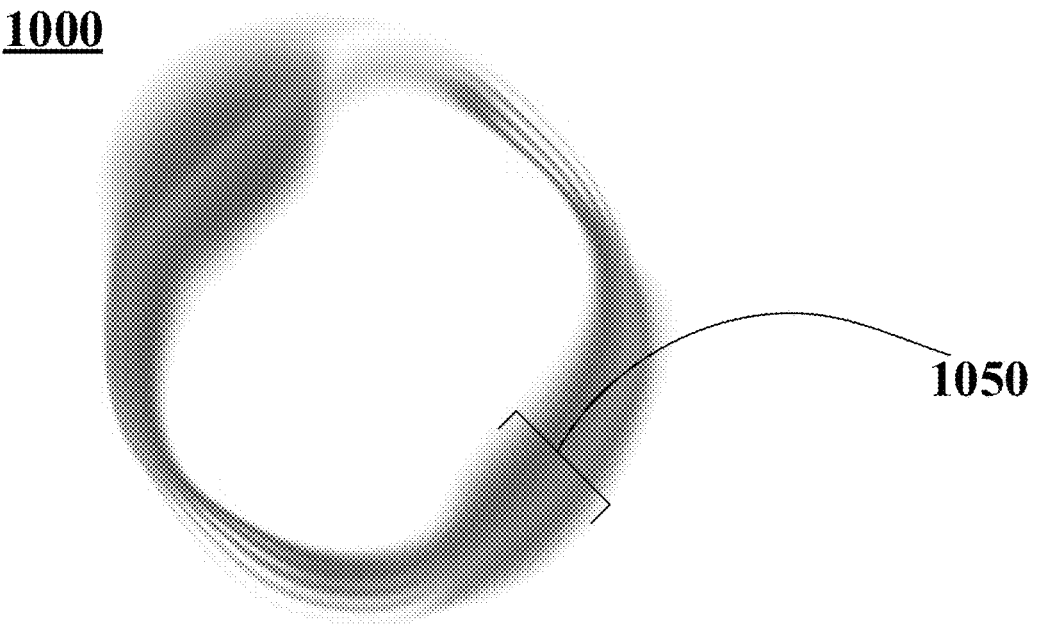
FIG. 10 is a representation of an artistic waveform having a marbled pattern according to another aspect of the disclosure.

FIG. 10 depicts an artistic waveform 1000, as described above. In this aspect, extensions 1050 have a marbled pattern such that the edges of extensions 1050 takes on a more muddled appearance while other portions of waveform 1000 that do not have an extension has a streak-like appearance. In this manner, extensions 1050 may be more visually distinguishable from the portions without extensions.

Figure 11:
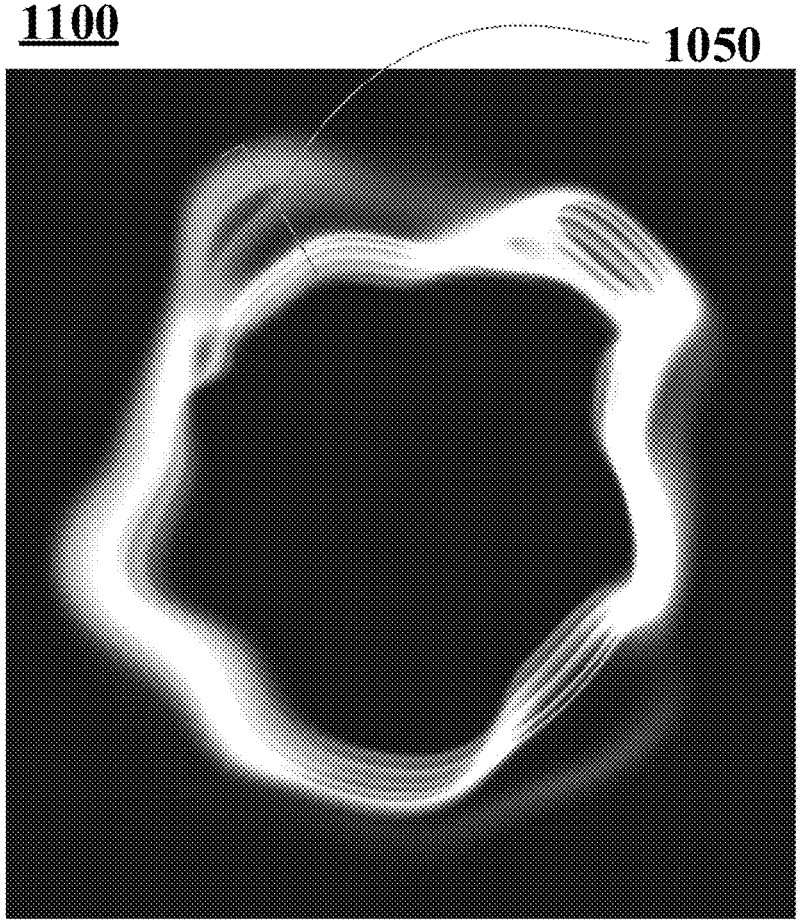
FIG. 11 is a representation of an artistic waveform having a light trail pattern according to another aspect of the disclosure.

FIG. 11 depicts an artistic waveform 1100 having extensions 1150, as described above. In this aspect, artistic waveform 1100 has a light trail pattern such that the waveform appears to be made of various streaks of light.

In other aspects, the patterns may have alternative visual extensions, such as jagged extensions, spiked extensions, or other geometric and/or artistic patterns. In yet other aspects, the center of the artistic waveform is completely filled in.

Figure 12A:
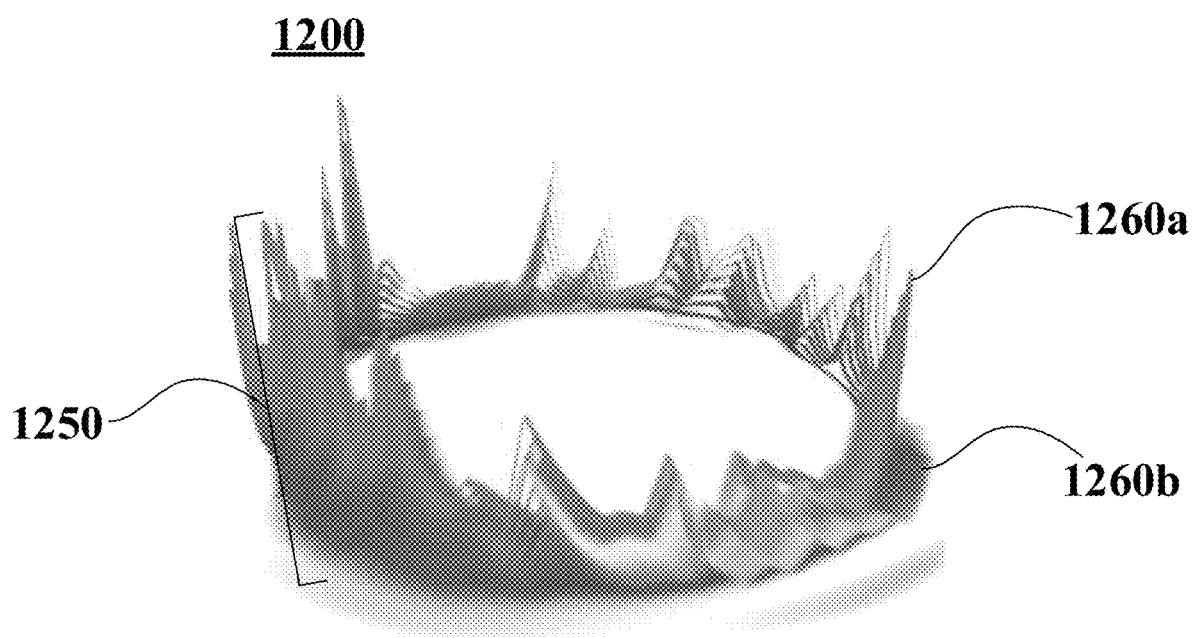
FIG. 12A is a representation of a three-dimensional artistic waveform having a spiked pattern according to one aspect of the disclosure.

The waveform may also be three-dimensionally generated such that the extensions of the applied pattern may extend in a radial direction to the center of the waveform while also extending above and below a circumferential plane defined by the baseline metrics. FIG. 12A depicts an isometric view of a three-dimensional artistic waveform 1200 having a spiked pattern with multiple layers, including layers 1260a, 1260b. In this aspect, extension 1250 has a spiked pattern which extends a radial direction from the center of a baseline metrics (not shown) and a z-distance perpendicular to a circumferential plane defined by the baseline metrics. This spiked pattern is made up of layers where each layer closer to the baseline metrics become more flat and less pronounced while the layers farther from the baseline metrics are sharper and more jagged. In alternative aspects, extensions 1250 can extend both above and below the baseline metrics. The multiple layers can alternatively indicate different measured metrics. For instance, where waveform 1200 depicts a user's emotional state, layer 1260a can represent a user's heart rate while layer 1260b can represent a user's motion.

Figure 12B:
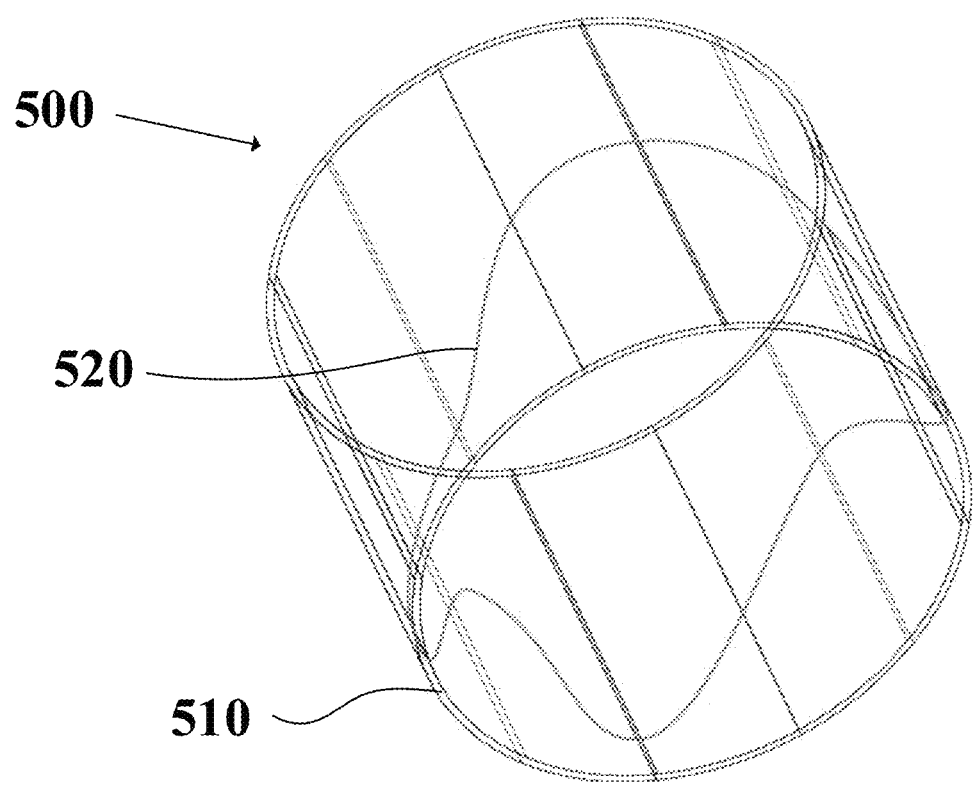
FIG. 12B is a representation of a waveform being extruded to form a three-dimensional waveform according to one aspect of the disclosure.
Figure 12C:
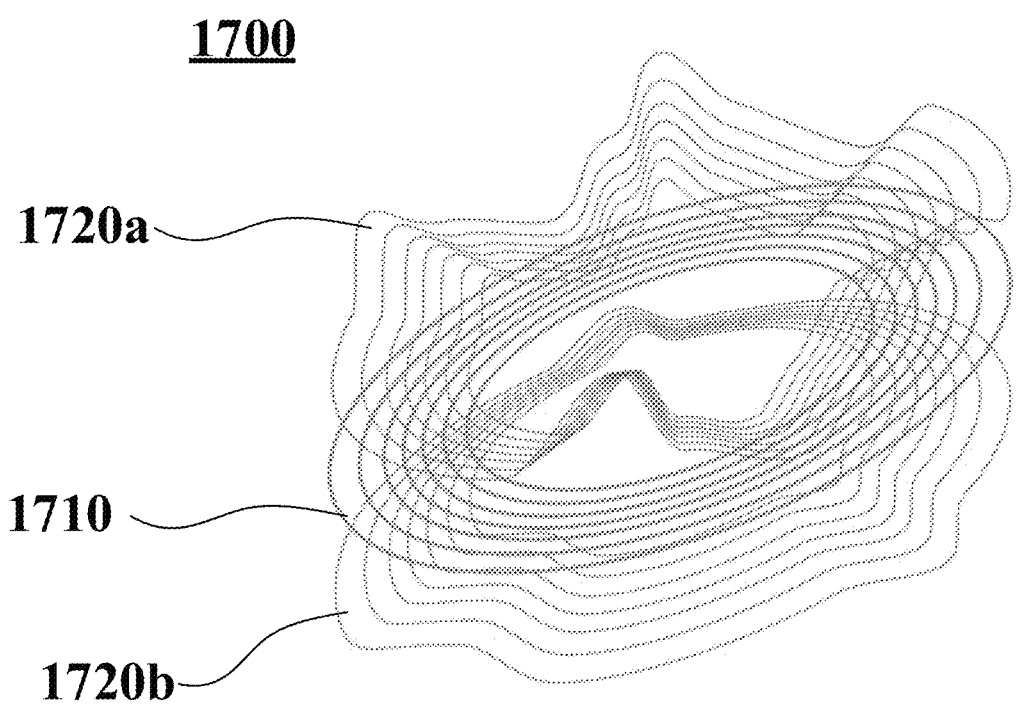
FIG. 12C is a representation of a three-dimensional waveform according to another aspect of the disclosure.

FIGS. 12B-C depicts the formation of a three-dimensional artistic waveform 1700 from a two-dimensional modified Cartesian waveform, such as waveform 500 as shown in FIG. 5. For instance, FIG. 12B depicts modified Cartesian waveform 500 being extruded from a two-dimensional plane. Baseline metrics 510 is given a first z-distance such that a three-dimensional depiction of baseline metrics 510 looks similar to a cylinder. Comparative metrics 520 is similarly given a three-dimensional effect by adding a second z-distance. Although FIG. 12B depicts baseline metrics 510 being extruded to include a set of lines running the first z-distance from baseline metrics 510 and another two-dimensional circle at a top end of those lines, in alternative aspects, baseline metrics 510 are not extruded, as shown in FIG. 12C.

Once a two-dimensional modified Cartesian waveform has been extruded to include a z-distance, additional waveforms may be included. For instance, FIG. 12C depicts where three-dimensional artistic waveform 1700 includes baseline metrics 1710 and comparative metrics 1720a, 1720b. In this aspect, baseline metrics 1710 is not extruded and includes a set of concentric rings with a decreasing radius. Comparative metrics 1720a represents a first set of metrics while comparative metrics 1720b represents a second set of metrics. For example, where waveform 1700 measures a user's emotional state, comparative metrics 1720a can represent a user's heart rate while layer 1720b can represent a user's motion. Comparative metrics 1720a, 1720b also includes a set of concentric waveforms with a decreasing radius and proportionally decreasing z-distance. The radially-decreasing rings and waveforms of the respective baseline metrics and comparative metrics allows the respective metrics to be more visually distinguishable from the others while providing a more visually-appealing look. Waveform 1700 may alternatively be an intermediate step prior to minimizing the z-distance between each of the metrics to form a waveform similar to that of waveform 1200, as shown in FIG. 12A.

Figure 13:
FIG. 13 is a representation of a three-dimensional artistic waveform having a dotted pattern according to another aspect of the disclosure.

FIG. 13 depicts an isometric view of a three-dimensional artistic waveform 1300, as described above. In this aspect, extension 1350 has dots radially extending from the center of waveform 1300 while also vertically extending from a circumferential plane defined by the baseline metrics (not shown). In this manner, a side view of waveform 1300 may depict an appearance of a two-dimensional and linear waveform.

Figure 14:
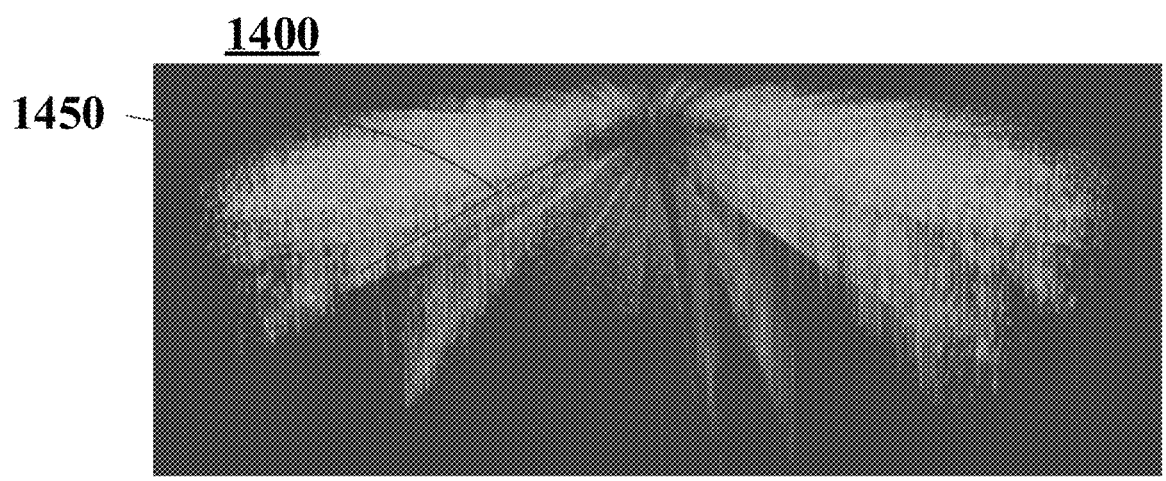
FIG. 14 is a representation of a three-dimensional artistic waveform having a pattern of vertical lines according to another aspect of the disclosure.

FIG. 14 depicts an isometric view of a three-dimensional artistic waveform 1400, as described above. In this aspect, extensions 1450 radially extend in a succession of vertical lines where each line extends a random vertical distance within a set boundary.

Animating the Waveforms

Figure 15A:
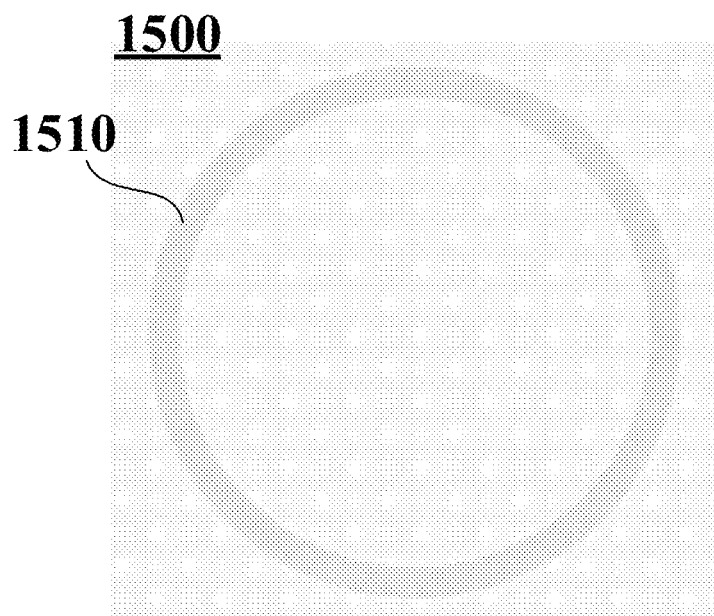
FIG. 15A is a representation of an artistic waveform according to one aspect of the disclosure.

Although the waveforms described above may be instantly displayed to a user upon request, an aspect of the disclosure includes an animation displaying the waveform's generation prior to the waveform being displayed. For instance, FIGS. 15A-D depicts an animation of artistic waveform 1500. FIG. 15A depicts a circular representation of baseline metrics 1510 representing the initial display of waveform 1500 at the beginning of the animation. Where a user's emotional state is being animated, at this point in the animation, waveform 1500 is the color of the user's maximal calmness.

Figure 15B:
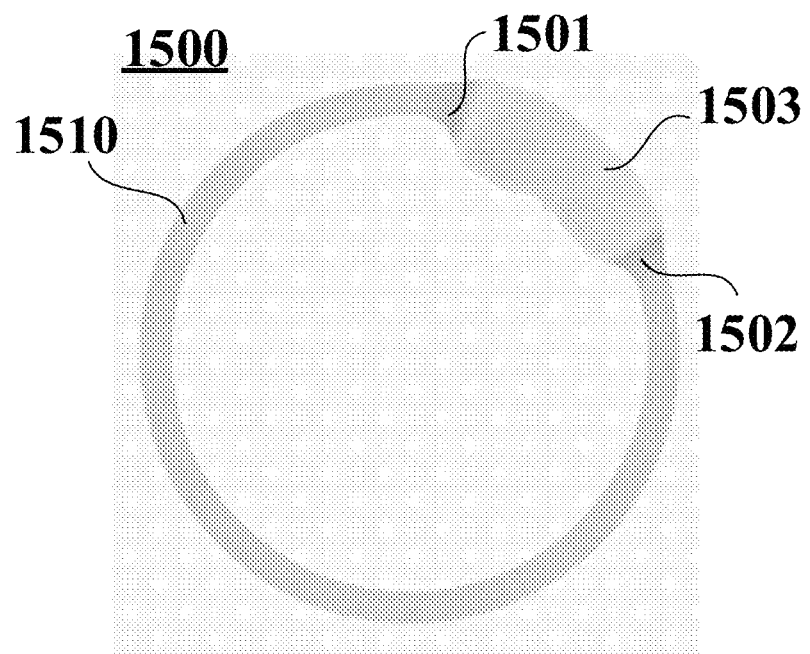
FIG. 15B is a representation of the artistic waveform of FIG. 15A having a first and second points.
Figure 15C:
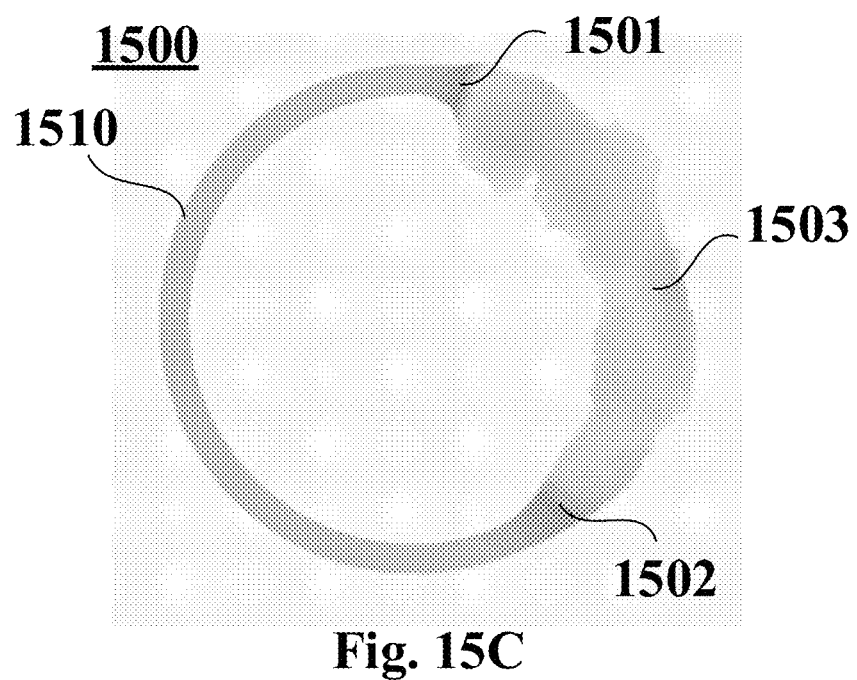
FIG. 15C is a representation of the artistic waveform of FIG. 15A where the second point is at a farther distance from the first point of FIG. 15B.
Figure 15D:
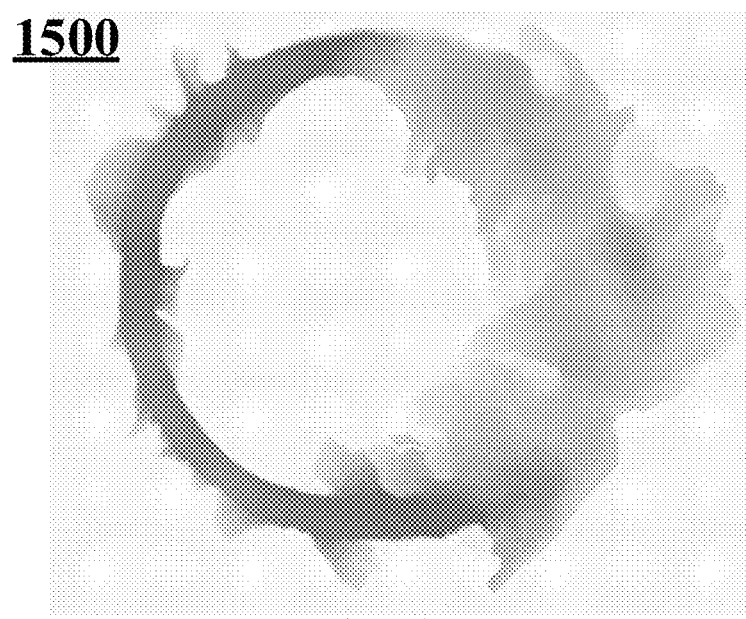
FIG. 15D is a representation of the completed artistic waveform of FIG. 15A.

FIGS. 15B-C depict baseline metrics 1510 with base point 1501, lead point 1502, and bloom 1560. Base point 1501 is the location where the animation of waveform 1500 begins. In this aspect, base point 1501 is at the top (or twelve o'clock position) of baseline metrics 1510. Lead point 1502 is the leading portion of the animation that travels along baseline metrics 1510. During animation, lead point 1502 travels in a clockwise direction from base point 1501 until lead point 1502 loops back to, and connects with, base point 1501. The color of the lead and base points may be the same color as that of when the two points meet at the completed waveform. For instance, as shown in FIG. 15D, base point 1501 and lead point 1502 is the same purple color as when lead point 1502 connects back with base point 1501, as shown in the top, twelve o'clock position, of waveform 1500.

Bloom 1503 expands from baseline metrics 1510 as lead point 1502 travels along baseline metrics 1510. The location of bloom 1503 immediately preceding lead point 1502 takes on the color of the corresponding color segment at that measured time. In this manner, as lead point 1502 travels, bloom 1503 will progressively expand from baseline metrics 1510 with the color to match artistic waveform 1500 when in its completed form, as shown in FIG. 15D. The expansion animation of bloom 1503 may correspond with the type of graphical pattern of the waveform's extensions being applied. For instance, where waveform 1500 is intended to have a water color bleeding effect pattern, bloom 1503 may expand in a manner similar to water color bleeding. In this manner, the expansion of bloom 1503 immediately preceding lead point 1502 expands in a rapid manner and has a substantially uniform area whereas the expansion of bloom 1503 closer to base point 1501 slows down but continues to expand in a slower, more fractal, manner similar to that of water color bleeding.

The animation gives the user additional contextual information of waveform 1500 that is not provided where there is no animation. For instance, the location of base point 1501 can indicate to a user where along artistic waveform 1500 the metrics were first measured. Additionally, the direction of travel of lead point 1502 may indicate to a user the direction of how to read artistic waveform 1500 from base point 1501. As an example, a user may understand (or input a setting) that waveform 1500 started gathering metrics at twelve o'clock in the morning. In such a case, base point 1501 may indicate where the twelve o'clock position is along waveform 1500 while the direction of lead point 1502 may indicate how to read waveform 1500 to understand the progress of the measured user state throughout the measured period.

Alternatively, in other aspects, base point 1501 does not start at the top of baseline metrics 1510 and may begin on any location along baseline metrics 1510, including the bottom or six o'clock position, or the like. In another aspect, lead point 1502 may travel in a counter-clockwise direction from base point 1501. In yet other aspects, bloom 1503 can expand in a manner that does not correspond with a natural pattern of completed waveform 1500. For instance, bloom 1503 may expand with a constant velocity as lead point 1502 travels along baseline metrics 1510. Alternatively, the extensions of artistic waveform 1500 may be animated instantly in its completed form as lead point 1502 travels along baseline metrics 1510. In yet other aspects, bloom 1503 may expand at a speed corresponding with the size of the peak distance (not shown) and/or valley distance (not shown) such that the greater the emotional state's intensity, the faster bloom 1503 expands. In yet other aspects, base point 1501 and lead point 1502 have different colors and/or have colors different from the color of the completed animation when the two points connect back together. Additionally, the animation may include animating the pattern as it's applied over a circular waveform, such as waveform 500 as shown in FIG. 5. In this manner, a user may be able to better understand what the color and shape of the pattern represents.

Additionally, the outer edges of completed waveform 1500 may be continually animated after waveform 1500 has been generated to provide additional information to a user. For instance, the manner in which edges of waveform 1500 flutter or wave may indicate the intensity of the measured user emotional state at that time. As an example, the greater the turbulence of the outer edges of waveform 1500, the more intense the user's emotional state at that time; and vice versa. Examples of turbulence may include where the outer edges of waveform 1500 have a shorter frequency, more vibration, or other dynamic movements to represent an increased intensity in a user's emotional state.

Using any of the aspects described above, a user may zoom in to more closely inspect a certain portion of a waveform. For instance, a user may interact with waveform 700, as shown in FIG. 7A, by clicking, tapping, or otherwise interacting with a client device to see an enlarged view of extension 750, as shown in FIG. 7B. In this manner, a user may take a closer look at the details of extension 750 to better understand the metrics that led to the spike in magnitude of extension 750. For example, zooming into a portion of the waveform may allow a user to see the waveform of any or all metrics (not shown) that led to extension 750 being generated. In this zoomed in view, these metrics may be individually selected to be overlaid over waveform 700 to allow for easy comparison with extension 750.

In an alternative aspect, zooming into waveform 700 may lead to the display of another waveform (not shown). For example, where waveform 700 measures a certain time period, such as one week, zooming into a portion of waveform 700 may display a separate waveform for the metrics measured of a shorter and discrete time period, such as one day, within the overall measured period. Other time periods may be used with the zoom function such as zooming into the waveform measuring one week within a larger waveform measuring one month, or the like.

As mentioned above, the methods discussed in this application are not limited to displaying a user's emotional state and may be used to display information in an unconventional, but intuitive and visually appealing, manner for the measured state of a user. For example, graphical waveforms may be used to represent a user's level of stress, fitness level, sleep quality, or the like.

Although the disclosure herein has been described with reference to particular aspects, it is to be understood that these aspects are merely illustrative of the principles and applications of the present disclosure. It is therefore to be understood that numerous modifications may be made to the illustrative aspects and that other arrangements may be devised without departing from the spirit and scope of the present disclosure as defined by the appended claims.

The invention claimed is:

1. A method comprising:
   receiving, by one or more processors, data from one or more sensors over a period, the data having at least a first value and a second value within the period;
   generating, by the one or more processors, a graphical representation of the received data against the period, wherein the graphical representation comprises:
      a first end corresponding to a beginning of the period and a second end corresponding to an end of the period, the first end being connected to the second end, and
      a center;
      wherein a first distance between the center and a first portion of the graphical representation corresponds to the first value of the data, and a second distance between the center and a second portion of the graphical representation corresponds to the second value of the data, wherein the first distance is different than the second distance; and
   providing the graphical representation for display.

2. The method of claim 1, further comprising generating a Cartesian representation of the received data, wherein the period is represented along an x-axis and the data is represented along a y-axis;
   wherein generating the graphical representation comprises manipulating the Cartesian representation.

3. The method of claim 1, further comprising determining a baseline metric having a baseline distance from the center.

4. The method of claim 3, further comprising providing the baseline metric for display.

5. The method of claim 1, further comprising overlaying a pattern having a shape and color over the graphical representation to produce an artistic representation having a first extension based on at least one of the first distance or the second distance.

6. The method of claim 5, wherein the pattern has a first edge, the method further comprising animating the first edge to have a first movement.

7. The method of claim 5, further comprising changing the color of the pattern based on at least one of the first distance or the second distance.

8. The method of claim 5, further comprising generating a random appearance to the pattern.

9. The method of claim 8, wherein generating the random appearance includes the random appearance having a geometric sequence, wherein the geometric sequence at least repeats or changes in size.

10. The method of claim 9, wherein the modified Cartesian representation comprises a circle.

11. The method of claim 5, further comprising generating an appearance to the pattern selected from the group consisting of a dotted pattern, a halo pattern, a marbled pattern, and a light trail pattern.

12. The method of claim 1, wherein the graphical representation has a circumferential plane, and the method further comprises generating a three-dimensional appearance to the pattern, wherein the three-dimensional appearance includes at least one extension that extends in a radial direction from the center and a vertical direction from the circumferential plane.

13. A system comprising:
one or more computing devices; and
memory storing instructions, the instructions being executable by the one or more computing devices;
wherein the one or more computing devices are configured to:
receive data from one or more sensors, the data over a period, the data having at least a first value and a second value within the period;
generate a graphical representation of the received data against the period, wherein the graphical representation comprises:
a first end corresponding to a beginning of the period and a second end corresponding to an end of the period, the first end being connected to the second end, and
a center;
wherein a first distance between the center and a first portion of the graphical representation corresponds to the first value of the data, and a second distance between the center and a second portion of the graphical representation corresponds to the second value of the data, wherein the first distance is different than the second distance; and
provide the graphical representation for display.

14. The system of claim 13, wherein the one or more computing devices is a user-wearable device.

15. The system of claim 13, wherein the one or more computing devices are further configured to overlay a pattern having a shape and color over the graphical representation to produce an artistic representation having a first extension based on at least one of the first distance or the second distance.

16. The system of claim 15, wherein the one or more computing devices are further configured to change the color of the pattern based on at least one of the first distance or the second distance.

17. The system of claim 16, the one or more computing devices are further configured to generate a random appearance to the pattern.

18. A non-transitory computing-device readable storage medium on which computing-device readable instructions of a program are stored, the instructions, when executed by one or more computing devices, causing the one or more computing devices to perform a method, the method comprising:
receiving data from one or more sensors, the data over a period, the data having at least a first value and a second value within the period;
generating a graphical representation of the received data against the period, wherein the graphical representation comprises:
a first end corresponding to a beginning of the period and a second end corresponding to an end of the period, the first end being connected to the second end, and
a center;
wherein a first distance between the center and a first portion of the graphical representation corresponds to the first value of the data, and a second distance between the center and a second portion of the graphical representation corresponds to the second value of the data, wherein the first distance is different than the second distance; and
providing the graphical representation for display.

19. The non-transitory computing-device readable storage medium of claim 18, further comprising overlaying a pattern having a shape and color over the modified Cartesian representation to produce an artistic representation having a first extension based on at least one of the first distance or the second distance.

20. The non-transitory computing-device readable storage medium of claim 19, further comprising further comprising changing the color of the pattern based on at least one of the first distance or the second distance.

* * * * *